(12) United States Patent
Gruenbacher et al.

(10) Patent No.: US 6,293,991 B1
(45) Date of Patent: Sep. 25, 2001

(54) PROCESS FOR PRODUCING LIQUID PIG IRON COMPRISING RECIRCULATING AGGLOMERATED SLUDGES

(75) Inventors: Herbert Gruenbacher, Marien; Guenter Schrey, Linz, both of (AT)

(73) Assignee: Deutsche Voest-Alpine Industrieanlagenbau GmbH (DE)

( * ) Notice: Subject to any disclaimer, the term of this patent is extended or adjusted under 35 U.S.C. 154(b) by 0 days.

(21) Appl. No.: 09/402,337

(22) PCT Filed: Apr. 9, 1998

(86) PCT No.: PCT/EP98/02086

§ 371 Date: Oct. 6, 1999

§ 102(e) Date: Oct. 6, 1999

(87) PCT Pub. No.: WO98/46800

PCT Pub. Date: Oct. 22, 1998

(30) Foreign Application Priority Data

Apr. 16, 1997 (AT) .................................................. A 659/97

(51) Int. Cl.[7] .................................................. C21B 11/00

(52) U.S. Cl. .................. 75/492; 75/961; 75/766; 75/768; 75/771; 75/773

(58) Field of Search ............................ 75/492, 961, 773, 75/771, 766, 768

(56) References Cited

U.S. PATENT DOCUMENTS 5,514,203 5/1996 Gruenbacher ........................ 75/492

5,531,805 * 7/1996 Worner .................................. 75/961

FOREIGN PATENT DOCUMENTS

| 376241 | 3/1984 | (AT) . |
| 400725 | 7/1995 | (AT) . |
| 4123626 | 1/1993 | (DE) . |
| 0012363 | 6/1980 | (EP) . |
| 0623684 | 11/1994 | (EP) . |
| 9634120 | 10/1996 | (WO) . |

* cited by examiner

Primary Examiner—Melvyn Andrews
(74) Attorney, Agent, or Firm—Ostrolenk, Faber, Gerb & Soffen, LLP

(57) ABSTRACT

In a method of producing molten pig iron (13) or molten steel pre-products from charging substances formed of iron ore (4), preferably in the shape of lumps and/or pellets, and optionally of fluxes (5), the charging substances are directly reduced to sponge iron in a reduction zone (2), the sponge iron is charged into a melt-down gasifying zone (12) and, there, is melted under the supply of carbon carriers (10) and an oxygen-containing gas, wherein a $CO$–$H_2$-containing reducing gas is generated that is withdrawn from the melt-down gasifying zone (12) and introduced into the reduction zone (2), is reacted there and is withdrawn as a topgas, wherein the topgas is subjected to scrubbing and the sludges thus separated are at least partially agglomerated. To utilize the agglomerates thus formed while expending as little energy as possible, the agglomerates are recirculated into the reduction zone (2).

12 Claims, 1 Drawing Sheet

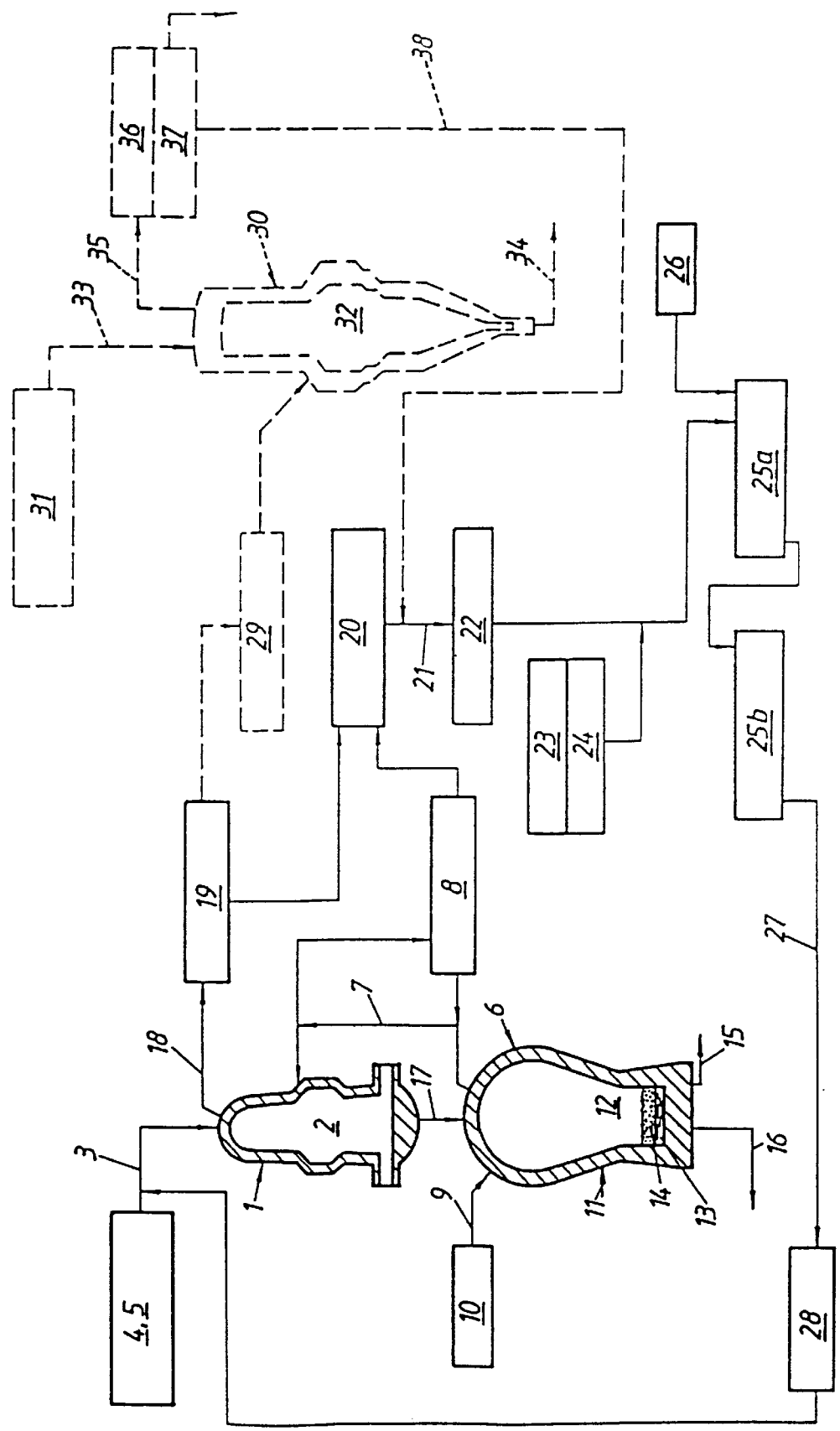

PROCESS FOR PRODUCING LIQUID PIG IRON COMPRISING RECIRCULATING AGGLOMERATED SLUDGES

BACKGROUND OF THE INVENTION

1. Field of the Invention

The invention relates to a method of producing molten pig iron or molten steel pre-products from charging substances formed of iron ore, preferably in the shape of lumps and/or pellets, and optionally of fluxes, wherein the charging substances are directly reduced to sponge iron in a reduction zone, the sponge iron is charged into a melt-down gasifying zone and, there, is melted under the supply of carbon carriers and an oxygen-containing gas, wherein a CO- and $H_2$-containing reducing gas is generated, is withdrawn from the melt-down gasifying zone and introduced into the reduction zone, is reacted there and is withdrawn as a topgas, and wherein the topgas is subjected to scrubbing and the sludges thus separated are at least partially agglomerated, and a plant for carrying out the method.

2. Brief Description of the Related Art

A method of this kind is known f.i. from AT-B-376 241. Here, solid particles are separated from the reducing gas and from the topgas leaving the reduction zone in cyclones and are mixed with a binder, such as iron oxide dust, are hot-briquetted and supplied to the melt-down-gasifying zone. This solution is, however, expensive with regard to investment and operating costs. Further, the charging of iron oxides into the melt-down gasifying zone renders it necessary to do reduction work in order to reduce the iron oxide, whereby energy that would be needed for the melting operation is withdrawn from the melt-down gasifying zone.

From AT-B-400 725 it is known for the sludges formed in the scrubbing of the reducing gas that exits the melt-down gasifying zone and of the topgas that exits the reduction zone to be dewatered and granulated and finally charged back to the melt-down gasifying zone in the form of granulates. Here, too, reduction work has to be done in the melt-down gasifying zone, thus withdrawing overly great amounts of energy from the melt-down gasifying zone if very great quantities of granulates are used, which may result in a decrease in reductants and hence in process failures.

From DE-A-41 23 626 it is known to agglomerate residues from the iron and steelmaking industries and to charge the agglomerates to the upper burden area of a melting aggregate, wherein preheating and drying of the agglomerates takes place in this burden area of the melting aggregate. The burden passes through the melting aggregate in accordance with the countercurrent principle until it reaches the lower area of the melting aggregate, where it is molten. This known method involves a high energy demand inasmuch as the metallic wastes or residues are also dried and sintered in the melting aggregate and have to travel through the melting aggregate, thereby exerting a negative effect on the process taking place in the melting aggregate.

Further, a method is known from EP-A-0 623 684 in which wastes and residues containing coal dust and iron in metallic or oxidic form are collected separately in three groups, according to their chemical compositions, wherein the first group is to contain predominantly iron in oxidic form, the second group predominantly iron in metallic form and the third group predominantly carbon-containing substances. For utilization, the substances of the first group are charged into the reduction zone and those substances belonging to the second and third groups are charged directly into the melt-down gasifying zone. The dusts that have been separated from the topgas of the reduction zone with this method are recirculated only into the melt-down gasifying zone. This causes an influence on the melting-gasifying process since energy is withdrawn from the melt-down gasifying zone in order to heat and melt the residues.

SUMMARY OF THE INVENTION

The invention has as its object to further develop a method of the initially described kind in such a way as to enable the sludges developed during the process to be recirculated into the process in a simple and efficient manner while expending as little energy as possible, wherein the disadvantages associated with the charging of the sludges into the melt-down gasifying zone, i.e. the necessity of doing more reduction work in the melt-down gasifying zone as well as a heat loss from heating the charge are to be avoided.

In accordance with the invention, this object is achieved in that the agglomerate (formed from at least a partial amount of the sludges which develop during the scrubbing of the topgas of the reduction zone) is recirculated into the reduction zone, preferably only into the reduction zone.

According to a preferred embodiment, at least a partial amount of the reducing gas that exits the melt-down gasifying zone is likewise scrubbed, the sludges thus obtained are at least partially agglomerated and the agglomerate thus formed is recirculated into the reduction zone.

Advantageously, the sludges that are obtained in the scrubbing of the reducing gas from the melt-down gasifying zone and that have to be agglomerated are subjected to further treatment together with the sludges obtained in the scrubbing of the topgas from the reduction zone that have to be agglomerated. In this way, investment costs can be minimized.

Optionally, the purified topgas from the reduction zone is subjected to $CO_2$ elimination, after scrubbing, and as an at least largely $CO_2$-free reducing gas is conducted to at least one further reduction zone serving for the direct reduction of metal ore, particularly of iron ore or pellets, after reacting with the metal ore in the further reduction zone (32) is withdrawn as an export gas and purified in a scrubber and the sludges obtained in the scrubbing of the export gas from the further reduction zone are at least partially agglomerated and the agglomerate thus formed is recirculated into the first reduction zone. Thus the sludges that develop during the scrubbing of the export gas of the further reduction zone can also be re-utilized in an efficient manner.

In doing so, the sludges that arise in the scrubbing of the export gas from the further reduction zone and that have to be agglomerated are advantageously subjected to further treatment together with the sludges that arise in the scrubbing of the topgas from the first reduction zone and/or together with the sludges that arise in the scrubbing of the reducing gas from the melt-down gasifying zone and that have to be agglomerated.

In accordance with a preferred embodiment of the method of this invention, the sludges that have to be agglomerated are first of all dewatered to a residual moisture content. Advantageously, oxidic dusts, optionally coal dust, and calcined lime are added to the sludges for agglomeration, preferably in a two-step continuous process.

The granulates thus formed consist of the following main components (in roughly equal proportions):
 iron and iron oxides
 calcium hydroxide
 carbon coal ash constituents such as $Al_2O_3$, $SiO_2$, etc.

It is known that in reducing $Fe_2O_3$ and FeO with CO in a reduction zone, heat is developed, and it has been found that due to a resultant temperature increase overheating may occur in the reduction zone. As a consequence, there will be caking of the reduction products—known as clustering—and hence an interruption of the reduction operation.

This can be avoided by proceeding in accordance with the invention since as the above granulates are charged to the reduction zone the following advantageous processes take place in the same:

the Boudouard reaction, $C+CO_2 \rightarrow 2CO$, which is endothermic, is promoted by the carbon contained in the granulates.

the content of calcium hydroxide, which is formed from added CaO, triggers a further endothermic reaction (re-formation of CaO).

By the two endothermic reactions it is rendered feasible to purposefully limit the temperature in the reduction zone during the reduction of the ore. As a consequence, caking of the reduction products (clustering) is prevented; also, the amount and quality of the topgas are enhanced.

From DE-A-41 23 626 it is known to recirculate into the melting aggregate filter dusts from the off gas of the melting aggregate. Yet, these filter dusts do not contain the components recited above, i.e. the above-recited advantageous processes proceeding in the melting aggregate cannot take place.

In accordance with a further preferred embodiment of the method of the invention there are charged oxidic dusts from the pouring-bay dust collection of a metallurgical plant, particularly from a plant for carrying out the method or from the dedustification plant of an electric furnace of a steelworks connected downstream of the melt-down gasifying zone and/or of the further reduction zone.

Suitably, the agglomerates or granulates, respectively, are dried prior to recirculation into the reduction zone.

A plant for the production of molten pig iron or molten steel pre-products from charging substances formed of iron ore, preferably in the shape of lumps and/or pellets, and optionally of fluxes, wherein said plant which comprises a reduction reactor for iron ore, a melter gasifier, a feed duct for a reducing gas generated in the melter gasifier, which feed duct connects the melter gasifier with the reduction reactor, a conveying duct for the reduction product generated in the reduction reactor, which conveying duct connects the reduction reactor with the melter gasifier, a topgas discharge duct departing from the reduction reactor and equipped with a scrubber, feed ducts for carbon carriers and oxygen-containing gases that open into the melter gasifier and a tap for pig iron and slag that is provided at the melter gasifier and a sludge discharge duct that from the scrubber leads to a means for agglomerating at least a portion of the sludges arising in the scrubber is characterized in that the means (25a, 25b) for agglomerating the sludges is flow-connected with the reduction reactor.

According to a preferred embodiment, in the reducing-gas feed duct which runs into the reduction reactor a second scrubber is provided for at least a partial amount of the reducing gas, from which scrubber a sludge discharge duct leads to a means for agglomerating at least a portion of the sludges which arise in the second scrubber, said means being flow-connected with the reduction reactor.

Advantageously, the sludge discharge duct associated with the second scrubber is flow connected with the sludge discharge duct associated with the first scrubber.

Optionally, a further reduction reactor is provided for receiving metal ore, in particular further iron ore or pellets, which reactor comprises a reducing-gas feed duct, an export-gas discharge duct equipped with a third scrubber, and a discharging device for the reduction product formed in this reduction reactor, wherein the topgas discharge duct of the first reduction reactor runs into a $CO_2$ elimination plant from which the reducing-gas feed duct of the further reduction reactor departs and runs into the further reduction reactor, and wherein a sludge discharge duct from the third scrubber leads to a means for agglomerating at least a portion of the sludges arising in the third scrubber, which means is flow-connected with the first reduction reactor.

According to a preferred embodiment, the sludge discharge duct associated with the third scrubber is flow-connected with the sludge discharge duct associated with the first and/or third scrubber.

Preferably the sludge discharge duct associated with the first, second and/or third scrubber leads to a sludge dewatering means prior to reaching the means for agglomerating the sludges, which suitably is constructed as a decanter centrifuge.

Suitably, the means for agglomerating the sludges is constructed as a two-step mixing and granulating means and according to a preferred embodiment is flow-connected with the first reduction reactor via a drying means.

BRIEF DESCRIPTION OF THE DRAWING

In the following, the invention is explained in greater detail by means of an exemplary embodiment depicted in the drawing, wherein the drawing illustrates a preferred embodiment of the plant for carrying out the method of the invention, in purely schematic representation.

DETAILED DESCRIPTION OF THE PREFERRED EMBODIMENTS

To a reduction reactor constructed as a shaft furnace 1, i.e. into the fixed-bed reduction zone 2 thereof, lumpy iron-oxide-containing charging substances 4, such as ore, optionally together with uncalcined fluxes 5, are charged from above via a feed duct 3. The shaft furnace 1 is in communication with a melter gasifier 6 in which a reducing gas is generated from carbon carriers and oxygen-containing gas. Via a feed duct 7, this reducing gas is supplied to the shaft furnace 1 through which it passes in counterflow to the charging substances 4. In the feed duct 7, there is provided a gas purification and gas cooling means 8 constructed as a scrubber, through which at least a partial stream of the reducing gas is conducted for temperature adjustment.

The melter gasifier 6 has a feed duct 9 for solid, lumpy carbon carriers 10 and feed ducts 11 for oxygen-containing gases. In the melter gasifier 6, molten pig iron 13 and molten slag 14 collect below the melt-down gasifying zone 12, which are tapped off separately, via a separate tap 15, 16, respectively.

The lumpy charging substances which have been partially and/or completely reduced to sponge iron in the reduction zone 2 of the shaft furnace 1 are supplied to the melter gasifier 6 through one or several conveying ducts 17, f.i. by means of delivery worms. To the upper portion of the shaft furnace 1, there is connected a discharge duct 18 for the topgas forming in the reduction zone 2. This topgas is conducted to a gas purification means 19 likewise constructed as a scrubber, in order to free it from dust and water vapor.

The sludges arising in the scrubber 19 are conducted to a thickener 20 along with the sludges resulting in the scrubber 8 from the scrubbing of the reducing gas supplied to the shaft furnace 1. From the thickener 20, the thickened sludges are supplied to a sludge drying means 22, e.g. a decanter centrifuge, via a conveying duct 21.

The dewatered sludges are mixed with dry oxidic dusts 23, such as ore fines and pouring-bay dusts, and with coal dust 24. This mixture of sludges and dusts is subsequently fed into a mixing and granulating means 25a, 25b where calcined lime 26 is added to the dewatered sludges in order to further reduce the residual moisture content. In the mixing and granulating means 25a, 25b, granulation of the mixture of sludges, dusts 23, 24 and calcined lime 26 to produce granulates is effected in two steps. With the two-step continuous granulation technique, the process steps of mixing and granulation take place in two reactors which are separate from each other and have different dimensions, are equipped with separate drives and are provided with mixing and granulating tools adapted to the tasks of mixing on the one hand and granulating on the other hand.

The granulates are fed to a drying means 28 through a conveying duct 27 and is subsequently charged into the shaft furnace 1 through the feed duct 3 for the lumpy iron-oxide-containing charging substances 4 and the fluxes 5. Drying of the granulates is preferably effected continuously in a third aggregate after granulation. The aggregate in question can be constructed such as to comprise a double jacket which can be heated.

In accordance with a further preferred embodiment of the method (illustrated by broken lines in the drawing), the topgas which has been purified in the scrubber 19 is subjected to $CO_2$ elimination, for example in a $CO_2$ scrubber 29 or a reformer, and subsequently is available as a reducing gas for a further reduction reactor 30 serving for the reception of metal ore - in the illustrated exemplary embodiment for the reception of iron ore or pellets 31. Optionally, this reducing gas is subjected to heating before it is fed into the further reduction reactor, which circumstance is, however, not represented in detail in the exemplary embodiment.

The further reduction reactor 30 is likewise constructed as a shaft furnace and, like the first shaft furnace 1, operates according to the countercurrent principle. In this second shaft furnace 30, iron ore in the form of lumps and/or pellets likewise is directly reduced to sponge iron in a fixed-bed reduction zone 32. The ore feed duct has been designated as 33 and the sponge-iron discharging device as 34.

The export gas withdrawn from the second reduction reactor 30 through the duct 35 is likewise subjected to purification and cooling in an export-gas scrubber 36 in order to purify it from dust particles and lower the water vapor content, whereupon it can be passed on for further use.

The sludges arising in the export-gas scrubber 36 are thickened in a thickener 37 and via a duct 38 are fed to the conveying duct 21.

In this way it is feasible to utilize all of the sludges arising in the scrubbing both of the topgas from the reduction zone 2 and of the reducing gas from the melt-down gasifying zone 12, and optionally of the export gas from the further reduction zone 32, to a meaningful use in that the agglomerates formed from the sludges are supplied to the reduction zone 2 and exert a beneficial influence on the process which takes place in the reduction zone 2. The reason for this is that the progress of the heat-consuming Boudouard reaction, $C+CO_2 \rightarrow 2CO$, in the reduction zone 2 is promoted due to the carbon which is always present in the agglomerates, whereby it becomes feasible to purposefully limit the temperature prevailing in the reduction zone 2 and prevent caking of the reduction products.

The invention is not limited to the exemplary embodiment illustrated in the drawing but also comprises other embodiments. For example, the sludges separated in the scrubbers 8, 19 and 36 can be supplied to the reduction zone 2 separately from each other through respective separate conveying ducts, optionally after dewatering in separate sludge dewatering means or after agglomeration in separate agglomerating means, respectively. In this way, the sludges, which may possibly be of different chemical compositions, can be subjected to a targeted treatment before they are charged into the reduction zone 2.

What is claimed is:

1. Method of producing molten pig iron or molten steel pre-products from charging substances of iron ore comprising:

directly reducing the charging substances to sponge iron in a reduction zone;

charging the sponge iron into a melt-down gasifying zone;

melting the sponge iron in the melt-down gasifying zone under the supply of carbon carriers and an oxygen-containing gas, whereby a CO- and $H_2$-containing reducing gas is generated;

withdrawing the generated reducing gas from the melt-down gasifying zone;

introducing the withdrawn reducing gas into the reduction zone to be reacted with the sponge iron;

withdrawing the reacted reducing gas from the reduction zone as a topgas;

scrubbing the topgas to separate sludges therefrom;

at least partially agglomerating the sludges; and recirculating the agglomerated sludges into the reduction zone.

2. Method according to claim 1, wherein at least a partial amount of the reducing gas that exits the melt-down gasifying zone is scrubbed, and wherein the sludges thus obtained are at least partially agglomerated and the agglomerate thus formed is recirculated into the reduction zone.

3. Method according to claim 2, further comprising, prior to agglomeration, subjecting to further treatment the sludges obtained in the scrubbing the reducing gas from the melt-down gasifying zone and the sludges obtained in the scrubbing of the topgas from the reduction zone.

4. Method according to claim 1, further comprising:

after scrubbing, subjecting the purified topgas from the reduction zone to $CO_2$ elimination;

conducting the at least largely $CO_2$-free reducing gas to at least one further reduction zone serving for the direct reduction of metal ore;

after reacting with the metal ore in the further reduction zone, withdrawing the reacted reducing gas as an export gas;

purifying the withdrawn gas in a scrubber to obtain sludges from the scrubbing of the export gas from the further reduction zone;

at least partially agglomerating the sludges; and recirculating the formed agglomerates into the first reduction zone.

5. Method according to claim 4, further comprising, prior to agglomeration, subjecting the sludges obtained by the scrubbing of the export gas from the further reduction zone, to further treatment together with the sludges obtained by the scrubbing of the topgas from the first reduction zones, and/or together with the sludges obtained by the scrubbing of the reducing gas from the melt-down gasifying zone.

6. Method according to claim 1, further comprising dewatering the sludges to be agglomerated to a residual moisture content.

7. Method according to claim 1, further comprising adding oxidic dusts and calcined lime to the sludges prior to agglomeration.

8. Method according to claim 1, further comprising mixing the sludges to be agglomerated with oxidic dusts and calcined lime and then agglomerating the mixture in a two-step continuous process, and wherein agglomerating the sludges includes granulating the same.

9. Method according to claim 7, wherein the oxidic dusts are obtained from a pouring-bay dust collection of a metallurgical plant.

10. Method according to claim 7, wherein the oxidic dusts are obtained either from a plant for carrying out the method or from a dedustification plant of an electric furnace connected downstream of the melt-down gasifying zone and/or a further reduction zone.

11. Method according to claim 1, further comprising driving the agglomerates prior to recirculation into the reduction zone.

12. Method according to claim 7, further comprising adding coal dust to the sludges prior to agglomeration.

* * * * *